(12) United States Patent
Kang et al.

(10) Patent No.: US 9,231,632 B2
(45) Date of Patent: Jan. 5, 2016

(54) APPARATUS FOR INTERFERENCE CANCELLATION IN MIMO RECEIVER, METHOD FOR INTERFERENCE CANCELLATION IN MIMO RECEIVER AND MIMO RECEIVER

(71) Applicant: GCT Semiconductor, Inc., San Jose, CA (US)

(72) Inventors: Young-Hwan Kang, Seoul (KR); Ji-Ho Jang, San Jose, CA (US); Dae-Seok Nam, San Jose, CA (US)

(73) Assignee: GCT Semiconductor, Inc., San Jose, CA (US)

( * ) Notice: Subject to any disclaimer, the term of this patent is extended or adjusted under 35 U.S.C. 154(b) by 0 days.

(21) Appl. No.: 14/288,444

(22) Filed: May 28, 2014

(65) Prior Publication Data

US 2014/0355708 A1    Dec. 4, 2014

(30) Foreign Application Priority Data

May 28, 2013  (KR) .......................... 10-2013-0060324

(51) Int. Cl.
*H04B 7/02* (2006.01)
*H04L 1/02* (2006.01)
*H04B 1/12* (2006.01)
*H04B 7/08* (2006.01)
*H04J 11/00* (2006.01)

(52) U.S. Cl.
CPC ................ *H04B 1/12* (2013.01); *H04B 7/0854* (2013.01); *H04J 11/005* (2013.01); *H04J 11/0036* (2013.01)

(58) Field of Classification Search
CPC ....... H04B 1/12; H04B 7/0854; H04J 11/005; H04J 11/0036
USPC ........................................................... 375/267
See application file for complete search history.

(56) References Cited

U.S. PATENT DOCUMENTS

| 2008/0181174 | A1* | 7/2008 | Cho | 370/329 |
|---|---|---|---|---|
| 2011/0312275 | A1* | 12/2011 | Canpolat et al. | 455/63.1 |
| 2013/0102254 | A1* | 4/2013 | Cyzs et al. | 455/63.1 |
| 2013/0107785 | A1* | 5/2013 | Bhattad et al. | 370/312 |
| 2013/0343215 | A1* | 12/2013 | Li et al. | 370/252 |
| 2014/0140319 | A1* | 5/2014 | Doetsch et al. | 370/330 |
| 2014/0198866 | A1* | 7/2014 | Miyata | 375/260 |

* cited by examiner

*Primary Examiner* — Erin File
(74) *Attorney, Agent, or Firm* — Muir Patent Law, PLLC

(57) ABSTRACT

An interference canceller (500) includes an interference cancellation coefficient calculator (510) configured to calculate an interference cancellation coefficient using a received value located in a location of a reference signal (RS) from a channel estimate H calculated by a channel estimator and a received signal r delivered from an FFT, an interference cancellation filter (520) configured to cancel interference in the received signal and the channel estimate using the calculated interference cancellation coefficient, an increment or decrement operator (530) configured to increase or decrease the received signal and the channel estimate by $\lambda$ times; an interference cancellation output controller (540) configured to receive a channel estimate before interference cancellation and a channel estimate after interference cancellation to compare a signal before the interference cancellation with a signal after the interference cancellation and then determine whether to deliver the signal before applying the interference cancellation or the signal after applying the interference cancellation, and a switch (550) configured to receive a control signal from the interference cancellation output controller (540).

17 Claims, 8 Drawing Sheets

APPARATUS FOR INTERFERENCE CANCELLATION IN MIMO RECEIVER, METHOD FOR INTERFERENCE CANCELLATION IN MIMO RECEIVER AND MIMO RECEIVER

CROSS-REFERENCE TO RELATED APPLICATION

This application claims priority to and the benefit under 35 U.S.C. §119(a) of Korean Patent Application No. 2013-0060324, filed on May 28, 2013 in the Korean Intellectual Property Office, the entire disclosure of which is incorporated herein by reference.

BACKGROUND

1. Field

The following description relates to technology for canceling interference in a multiple-input multiple-output (MIMO) receiver, which is used, for example, in a multi-cell wireless communication system.

2. Discussion of Related Art

Wireless communication systems are configured to provide a data service in addition to a voice service, and are configured by service providers to suit a multi-cell environment. Examples of the systems include 2nd and 3rd generation mobile communication systems such as CDMA2000, 1xEVDO, and WCDMA, which are based on CDMA, and 3.5th and 4th generation mobile communication systems such as IEEE 802.16, LTE, and LTE-A, which are base on orthogonal frequency-division multiplexing (OFDM).

Signals from an adjacent cell act as interference to a terminal connected to a serving cell when the signals from the adjacent cell have the same frequency as those from the serving cell. Actually, since a 3rd or later generation mobile communication system has a channel bandwidth of several MHz or more, service providers have a limited number of channels such that they often cannot avoid using the same frequency between adjacent cells when systems are established. When there are adjacent cells using the same frequency, a signal transmitted from a base station in one adjacent cell acts as interference to a terminal that is located in a cell boundary, thereby reducing a received signal quality for the other cell (serving cell) and thus causing cell coverage and data rate to be degraded.

In particular, for a heterogeneous network having pico cells and femto cells that are available in an LTE-A system, which is a 4th generation mobile communication, interference between adjacent cells occurs frequently. This causes a macro cell coverage and a reception performance to be degraded.

In order to minimize the interference between cells, a method has been proposed in which allocation of resources to a terminal located in a cell boundary is avoided between a serving base station and an adjacent base station according to a time or frequency axis, thereby enhancing the coverage and data rate in the cell boundary. However, this method has limitations in that an additional system for exchanging resource allocation information between base stations should be established to share the resource allocation information, and spectral efficiency is decreased in a section where resource allocation is avoided between base stations or terminals because all frequency resources are not used.

An existing interference canceller uses a method of finding a covariance matrix for a signal with interference and noise among received signals and its inverse matrix to utilize the inverse matrix as an interference cancellation filter that is applied to the received signals and channel estimates, or a method of assuming that an interference signal is also a received signal and finding a minimum mean square error (MMSE) weight matrix in a higher order than that of multiple-input multiple-output (MIMO) between an original serving base station and a terminal.

SUMMARY OF THE INVENTION

In one general aspect, there is provided an interference canceller used in a MIMO receiver, the interference canceller including: an interference cancellation coefficient calculator configured to calculate an interference cancellation coefficient using a received value at a position of each reference signal (RS) from a channel estimate H calculated by a channel estimator of the MIMO receiver and a received signal r delivered from an FFT block of the MIMO receiver; and an interference cancellation filter configured to generate an interference-cancelled received signal r' and an interference-cancelled channel estimate H', using the interference cancellation coefficient. Here, the interference-cancelled received signal r' and the interference-cancelled channel estimate H' may be delivered to an ML detector of the MIMO receiver.

The interference canceller used in a MIMO receiver may further include a switch configured to deliver the received signal r and the channel estimate H to an ML detector of the MIMO receiver when a ratio of the channel estimate H and the interference-cancelled channel estimate H' does not exceed a threshold value, or to deliver the interference-cancelled received signal r' and the interference-cancelled channel estimate H' to the ML detector of the MIMO receiver when the ratio exceeds the threshold value.

The interference cancellation coefficient calculator may include: a covariance matrix calculator configured to use the received signal r and the channel estimate H to calculate a covariance matrix; and a square root inverse matrix calculator configured to calculate a square root inverse matrix of the covariance matrix.

The covariance matrix calculator may include a unit block covariance matrix calculator configured to calculate a unit block covariance matrix; and a moving average calculator configured to perform a moving average on the unit block covariance matrix to calculate an interference cancellation coefficient.

The interference cancellation coefficient calculator may use the received signal r and the channel estimate H and decompose a covariance matrix into a product of two square root matrices to calculate the interference cancellation coefficient.

The interference cancellation filter may cancel the interference by multiplying each of the received signal r and the channel estimate H by the interference cancellation coefficient $\hat{K}_j^{-1/2}$, respectively. Here, $\hat{K}_j$ may be a covariance matrix calculated for each unit block.

In another general aspect, there is provided a method of canceling interference in a MIMO receiver, the method including: converting a signal received from an antenna into a digital signal; converting the digital signal into a frequency domain received signal r using an FFT block; extracting a reference signal (RS) from the received signal r to estimate a channel value H; calculating an interference cancellation coefficient using a received value at a position of each RS in the channel estimate H and the received signal r; and generating the interference-cancelled received signal r' and the interference-cancelled channel estimate H', using the interference cancellation coefficient.

The process of calculating an interference cancellation coefficient may include calculating the covariance matrix using the received signal r and the channel estimate H; and calculating a square root inverse matrix of the covariance matrix.

The process of calculating the covariance matrix may include calculating a unit block covariance matrix, and performing a moving average on the unit block covariance matrix to calculate the interference cancellation coefficient.

The process of generating the interference-cancelled received signal r' and the interference-cancelled channel estimate H' may include canceling the interference by multiplying each of the received signal r and the channel estimate H by the interference cancellation coefficient $\hat{K}_j^{-1/2}$.

The method may further include delivering the received signal r and the channel estimate H to an ML detector when a ratio of the channel estimate H and the interference-cancelled channel estimate H' does not exceed a threshold value, and delivering the interference-cancelled received signal r' and the interference-cancelled channel estimate H' to the ML detector when the ratio exceeds the threshold value.

In yet another general aspect, there is provided a MIMO receiver including: a signal processor configured to convert a signal received from an antenna into a digital signal; an FFT block configured to convert the digital signal into a frequency domain received signal r; a channel estimator configured to extract a reference signal (RS) from the received signal r to estimate a channel value H; an interference canceller configured to calculate an interference cancellation coefficient using a received value at a position of each reference signal (RS) from the received signal r and the channel estimate H and to cancel interference from the received signal r and the channel estimate H using the interference cancellation coefficient; and an ML detector configured to use the interference-cancelled received signal r' and the interference-cancelled channel estimate H' from the interference canceller.

The interference canceller may include: an interference cancellation coefficient calculator configured to use the received signal r and the channel estimate H to calculate a unit block covariance matrix $\hat{K}_j$ and to perform a moving average on the unit block covariance matrix $\hat{K}_j$ to calculate an interference cancellation coefficient $\hat{K}_j^{-1/2}$; and an interference cancellation filter configured to multiply the interference cancellation coefficient $\hat{K}_j^{-1/2}$ by each of the received signal r and the channel estimate H to cancel the interference.

The MIMO receiver may further include a switch configured to deliver the received signal r and the channel estimate H to the ML detector when a ratio of the channel estimate H and the interference-cancelled channel estimate H' does not exceed a threshold value and deliver the interference-cancelled received signal r' and the interference-cancelled channel estimate H' to the ML detector when the ratio exceeds the threshold value.

Figure 1:
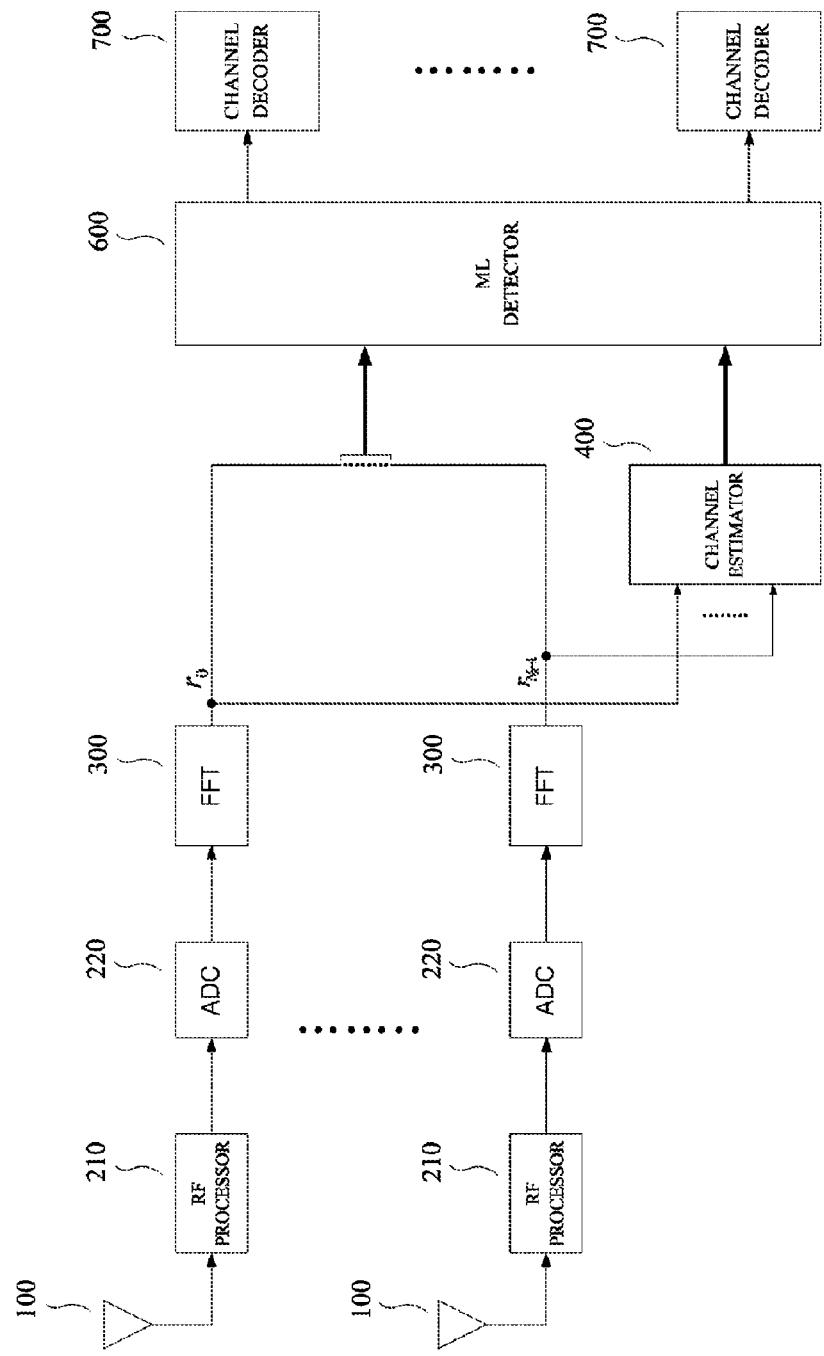
FIG. 1 is an exemplary block diagram showing a structure of a related art MIMO receiver having $N_R$ antennas.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

All terms (including technical and scientific terms) used herein have the same meaning as commonly understood by one of ordinary skill in the art to which this invention belongs, unless otherwise defined. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. As used herein, the term "and/or" includes any and all combinations of one or more of the associated listed items and may be abbreviated as "/". It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. Unless indicated otherwise, these terms are only used to distinguish one element from another. For example, a first circuit could be termed a second circuit, and, similarly, a second circuit could be termed a first circuit without departing from the teachings of the disclosure.

It should also be noted that in performing a method or an operating method, processes of the method may occur out of noted order unlike otherwise mentioned. In other words, the respective processes may be executed in the same order as the noted order, may be executed substantially concurrently, or may be executed in the reverse order.

Hereinafter, the interference canceller 500 used in the MIMO receiver, a method of canceling interference in the MIMO receiver, and the MIMO receiver 1000 will be described in detail.

FIG. 1 is an exemplary block diagram showing a structure of a related art MIMO receiver having $N_R$ antennas. A signal received from each antenna 100 is converted into a digital signal through a RF processor 210 and an analog-to-digital converter (ADC) 220. The digital signal is converted to a frequency domain signal through an FFT block 300. A channel estimator 400 extracts a reference signal from the frequency domain signal and estimates a wireless channel value between a transmitter and a receiver using the extracted signal. The channel estimate and a received data value are delivered to a MIMO ML detector 600 and a corresponding bit log likelihood ratio (LLR) for each stream is generated. A signal output from the MIMO ML detector 600 is decoded by a channel decoder 700 on a stream basis.

In a MIMO system for transmitting multiple streams, an operation of the ML detector 600 is induced as follows. First, a received signal r has a probability distribution as Equation (1) below.

$$f_r = \frac{1}{\pi^2 \det(K)} \exp(-(r-u)^H K^{-1}(r-u)) \quad (1)$$

where exp denotes an exponential function, and r denotes a column vector of received signals from $N_R$ antennas, which is expressed as Equation (2) below.

$$r = [r_0, r_1, \ldots, r_{N_R-1}]^T \quad (2)$$

u is an expected value of the received signal r, and a covariance matrix K is calculated as Equation (3) below.

$$K = E[(r-u)(r-u)^H] \quad (3)$$

where a function E[x] is is an expected value of a matrix X. In this case, the ML detector 600 may be designed to find a symbol that minimizes $(r-u)^H K^{-1}(r-u)$ in the exp function. In this case, a bit LLR of each symbol may be calculated as follows. A k-th bit LLR $\Lambda^{j,k}$ of a j-th symbol $s_j$ is as Equation (4) below.

$$\Lambda_{j,k} = \min_{s \in S_{s_{j(b_k=1)}}} [(r-Hs)^H K^{-1}(r-Hs)] - \min_{s \in S_{s_{j(b_k=0)}}} [(r-Hs)^H K^{-1}(r-Hs)] \quad (4)$$

where S is a transmission symbol vector transmitted from $N_T$ antennas, which is expressed as Equation (5) below.

$$S = [S_0, S_1, \ldots, S_{N_T-1}]^T \quad (5)$$

H is a channel matrix between a serving base station and a receiver. The serving base station denotes a base station that provides a communication service to a terminal. H is expressed as Equation (6) below.

$$H = \begin{bmatrix} h_{0,0} & h_{0,1} & \ldots & h_{0,N_T-1} \\ h_{1,0} & h_{1,1} & \ldots & h_{1,N_T-1} \\ \ldots & \ldots & \ldots & \ldots \\ h_{N_R-1,0} & \ldots & \ldots & h_{N_R-1,N_T-1} \end{bmatrix} \quad (6)$$

Accordingly, the ML detector 600 should calculate an inverse matrix of the covariance matrix K for ML detection.

The wireless communication system transmits a predetermined signal in order to assist in estimating a channel and demodulating a received signal. This predetermined signal is called a pilot signal or reference signal (hereinafter referred to as RS).

Figure 2:
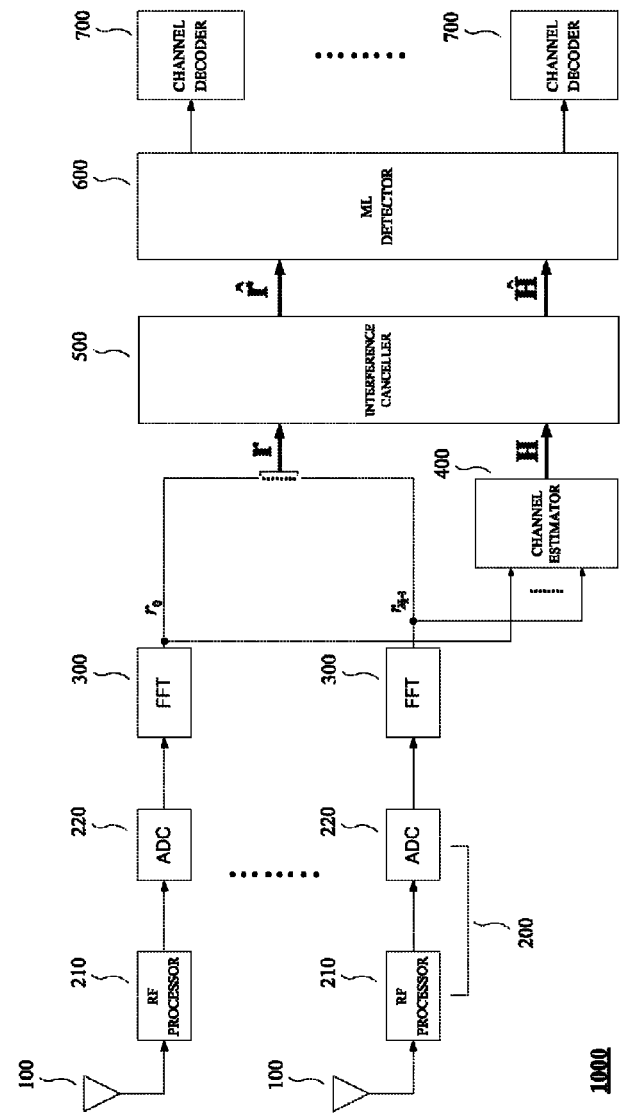
FIG. 2 is an exemplary block diagram showing a structure of an OFDM MIMO receiver having an interference canceller added thereto.

FIG. 2 is an exemplary block diagram showing a structure of an OFDM MIMO receiver having an interference canceller 500, which is operated in a multi-cell environment, added thereto. The MIMO receiver of FIG. 2 is configured by adding an interference canceller to the MIMO receiver of FIG. 1. Same reference numbers are used to refer to the same elements of the receiver of FIG. 1.

The MIMO receiver 1000 according to an embodiment in this example includes a signal processor 200 configured to convert a signal received from an antenna into a digital signal, an FFT block 300 configured to convert the digital signal into a frequency domain received signal r, a channel estimator 400 configured to extract a reference signal (RS) from the received signal r to estimate a channel value H, the interference canceller 500 configured to calculate an interference cancellation coefficient from the received signal r and the channel estimate H, and canceling interference from the received signal r and the channel estimate H using the interference cancellation coefficient, and an ML detector 600 configured to use the interference-cancelled received signal r' through the interference canceller 500 and the interference-cancelled channel estimate H' through the interference canceller 500.

The signal processor 200 includes an RF processor for converting an RF signal received from the antenna 100 into a baseband signal and an ADC 220 for converting the signal processed by the RF processor 210 into a digital signal.

The channel estimator 400 and the interference canceller 500 receive and process $N_R$ received signals $r_0$ to $r_{N_R-1}$. The number of received signals may vary depending on a communication system.

The interference canceller 500 calculates H' and r', which are signals with interference cancelled therein, using the received signal r and the channel value H calculated by the channel estimator 400 and delivers the H' and r' to the ML detector 600. In this case, the received signal r is an $N_R \times 1$ column vector of signals received from $N_R$ antennas, and the channel estimate H is an $N_R \times N_T$ matrix. $N_T$ is the number of transmission antennas of a base station.

Figure 3:
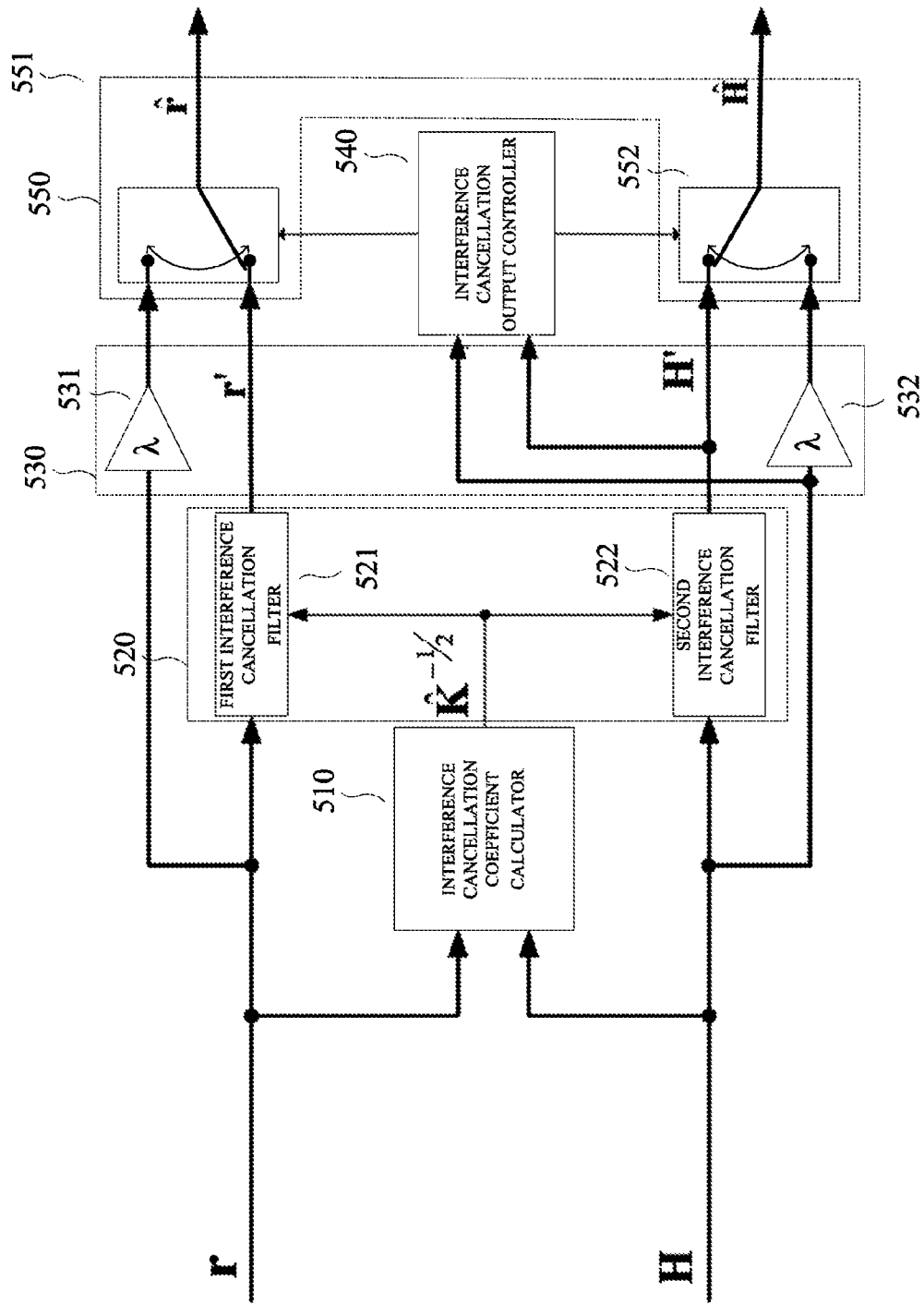
FIG. 3 is an exemplary block diagram showing the interference canceller of FIG. 2.

FIG. 3 is an exemplary block diagram of the interference canceller 500 of FIG. 2.

The interference canceller 500 includes an interference cancellation coefficient calculator 510 configured to calculate an interference cancellation coefficient using a received value located in a location of a reference signal (RS) from the channel estimate H calculated by the channel estimator 400 and the received signal r delivered from the FFT block 300, an interference cancellation filter 520 configured to cancel interference from the received signal and the channel estimate using the calculated interference cancellation coefficient, an increment or decrement operator 530 configured to increase or decrease the received signal and the channel estimate by λ times; an interference cancellation output controller 540 configured to receive a channel estimate before interference cancellation and a channel estimate after interference cancellation to compare signals before and after applying the interference cancellation and then determine whether to deliver the signal before applying the interference cancellation or the signal after applying the interference cancellation, and a switch 550 configured to receive a control signal from the interference cancellation output controller 540.

Each of the calculator 510, filter 520, controller 540 and switch 550, as well as the other elements discussed herein, such as the channel estimator 400, the signal processor 200, etc., may be implemented, for example, using hardware and/or software. For example, one or more of these elements may be implemented using circuitry, such transistor-based logic circuitry and/or other circuit elements. Therefore, the interference cancellation coefficient calculator 510 may be an interference cancellation coefficient calculator circuit, the interference cancellation filter 520 may be an interference cancellation filter circuit, the increment or decrement operator 530 may be an increment or decrement operator circuit, the interference cancellation output controller 540 may be an interference cancellation output controller circuit, and the switch 550 may be a switching circuit.

The increment or decrement operator 530 may determine whether to increase or decrease the received signal and the channel estimate depending on the situation. The interference cancellation filter 520 includes a first interference cancellation filter 521 applied to the received signal r and a second interference cancellation filter 522 applied to the channel estimate H. The increment or decrement operator 530 includes a first increment or decrement operator 531 applied to the received signal and a second increment or decrement operator 532 applied to the channel estimate. The switch 550 includes a first switch 551 applied to the received signal and a second switch 552 applied to the channel estimate. As described below, the interference cancellation output controller 540 and the switch 550 are not essential elements.

Figure 4:
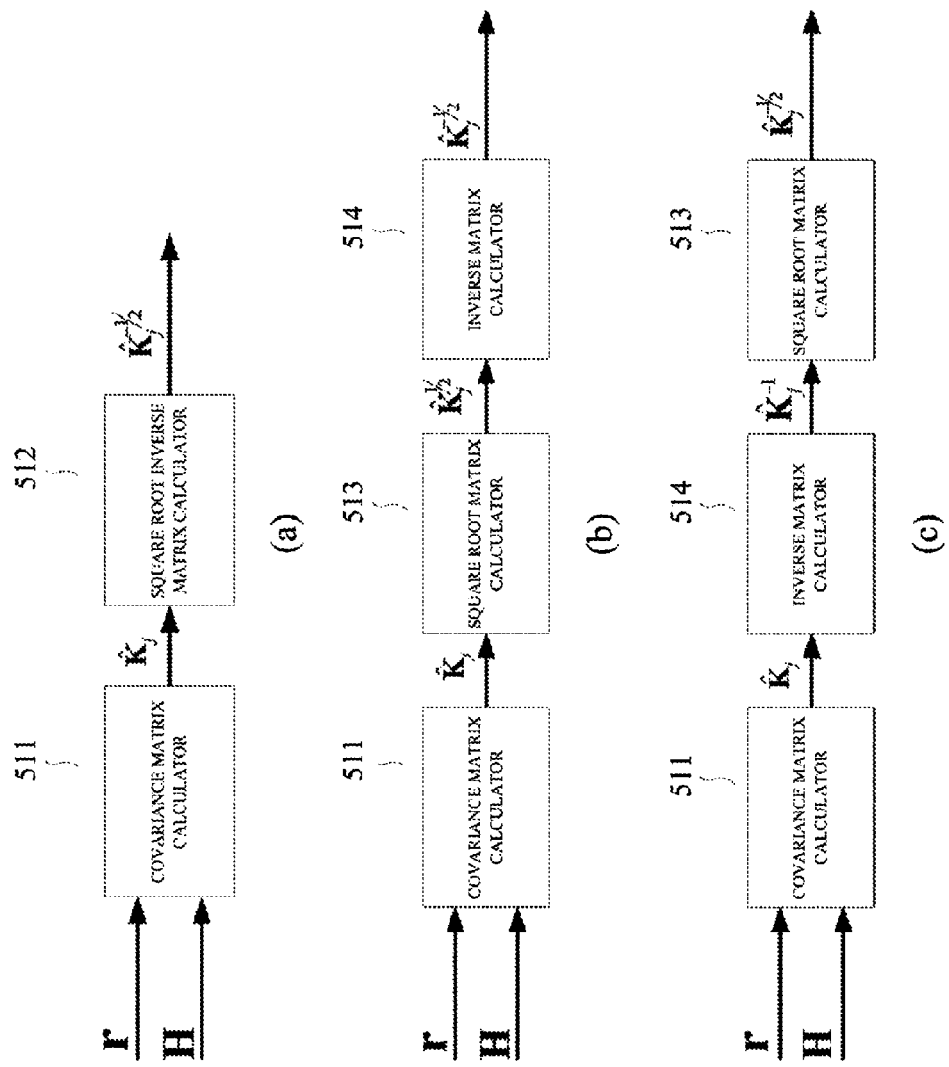
FIG. 4 is an exemplary block diagram showing a configuration of an interference cancellation coefficient calculator.

FIG. 4 is an exemplary block diagram showing a configuration of the interference cancellation coefficient calculator 510.

FIG. 4 (*a*) includes a covariance matrix calculator 511, which may be a covariance matrix calculator circuit, configured to use the received signal and the channel estimate to calculate a covariance matrix and a square root inverse matrix calculator 512, which may be a square root inverse matrix calculator circuit, configured to calculate a square root inverse matrix of the calculated covariance matrix at one time.

FIG. 4 (*b*) includes a covariance matrix calculator 511 configured to use the received signal and the channel estimate to calculate a covariance matrix, a square root matrix calculator 513 configured to first calculate a square root matrix when calculating a square root inverse matrix of the covariance matrix, and an inverse matrix calculator 514 configured to calculate an inverse matrix of the calculated square root matrix. Each of these calculators may be, for example, circuits.

FIG. 4 (*c*) includes a covariance matrix calculator 511 configured to use the received signal and the channel estimate to calculate a covariance matrix, an inverse matrix calculator 514 configured to first calculate an inverse matrix of the calculated covariance matrix, and a square root matrix calculator 513 configured to calculate a square root matrix of the calculated covariance inverse matrix. Each of these calculators may be, for example, circuits.

The covariance matrix calculator 511 may calculate the covariance matrix using the RS as Equation (7) below.

$$K = E_{k \in P}[(r_k - u_k)(r_k - u_k)^H] \qquad (7)$$
$$= E_{k \in P}[(r_k - H_k p_k)(r_k - H_k p_k)^H]$$

As such, the covariance matrix is calculated by collecting only k-th subcarriers, on which the RS is transmitted, to take an expected value. In Equation (7), $p_k$ is an RS symbol vector transmitted on the k-th subcarrier, and is $N_T$ in length.

Figure 5:
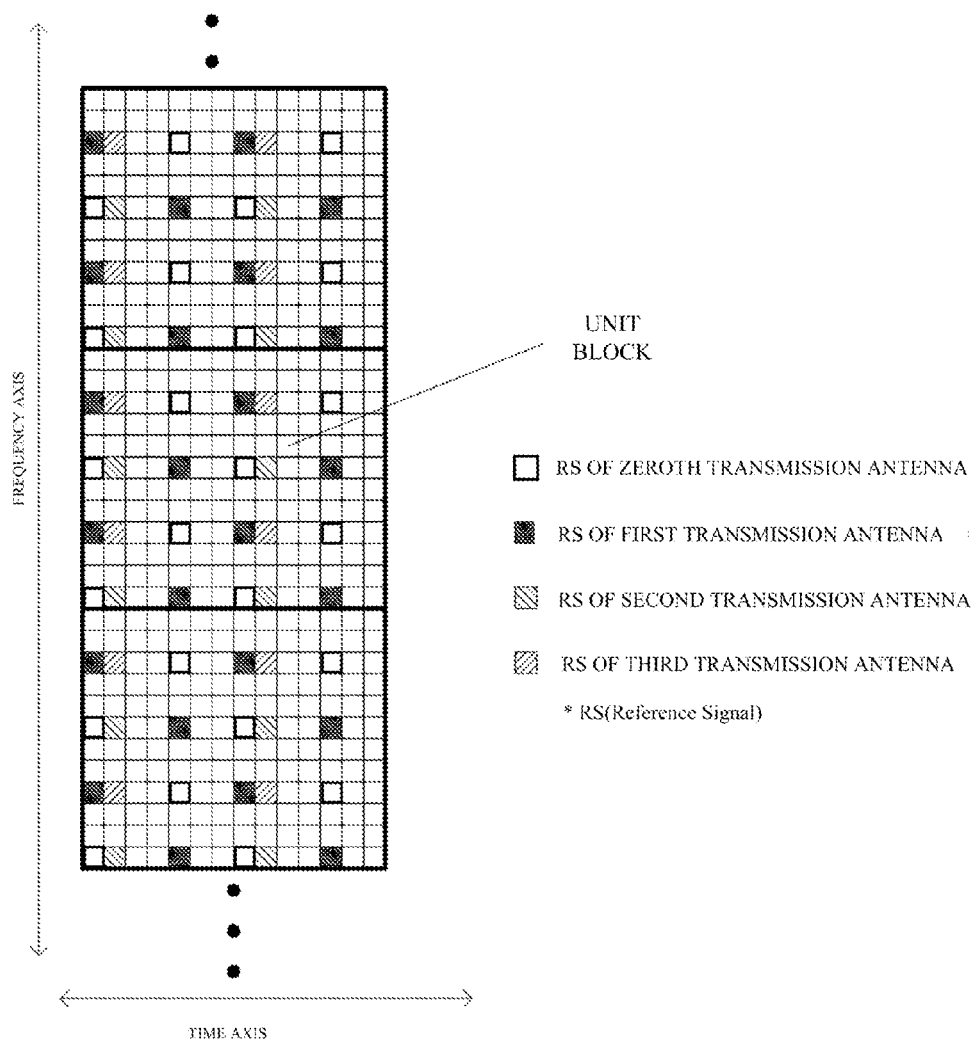
FIG. 5 is a view showing a diagram of a unit block for calculating an interference cancellation coefficient by applying an interference canceller to an LTE system.

FIG. 5 is a view showing a diagram of a unit block for calculating an interference cancellation coefficient by applying the interference canceller 500 to an LTE system. The unit block of FIG. 5 has 12 subcarriers on a frequency axis and 14 OFDM symbols on a time axis. A position of the RS transmitted from each antenna is marked in the unit block. The interference canceller 500 finds an interference cancellation coefficient using a signal received at a position of each RS and a channel estimate at the position. The size of the interference cancellation unit block may vary depending on a communication system and a reception environment.

FIG. 5 shows positions of RSs transmitted from 0th to 3rd transmission antennas of the LTE system base station. Equation (7) may be replaced with average calculation as Equation (8) below.

$$K = \frac{1}{M} \sum_{k \in P}[(r_k - H_k p_k)(r_k - H_k p_k)^H] \qquad (8)$$

In Equation (8), P is a set of indices of the subcarriers on which RSs are transmitted, and M is a total number of the subcarriers on which RSs are transmitted.

Since a statistical characteristic of the interference signal is frequency-selective on a frequency axis, K should be found within a certain region of frequency and time.

The said certain region of frequency and time sets a unit block having a specific number of subcarriers on a frequency axis and a specific number of OFDM symbols on a time axis. A unit block covariance matrix $K_j$ in the unit block is calculated as Equation (9) below.

$$K_j = \frac{1}{M_j} \sum_{k \in P_j}[(r_k - H_k p_k)(r_k - H_k p_k)^H] \qquad (9)$$

In Equation (9), $P_j$ is a set of indices of the subcarriers on which RSs are transmitted in j-th unit block on a frequency axis, and $M_j$ is a total number of the subcarriers on which RSs are transmitted in this unit block.

Figure 6:
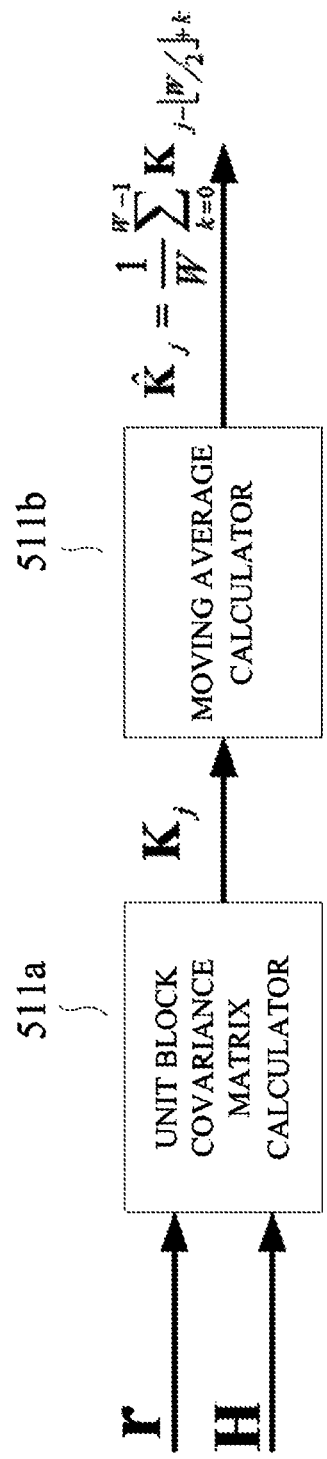
FIG. 6 is an exemplary block diagram showing a configuration of a covariance matrix calculator of FIG. 4.

FIG. 6 is an exemplary block diagram showing a configuration of the covariance matrix calculator 511 of FIG. 4.

The covariance matrix calculator 511 includes a unit block covariance matrix calculator 511*a* configured to calculate a unit block covariance matrix and a moving average calculator 511*b* configured to perform a moving average on the calculated unit block covariance matrix to calculate an interference cancellation coefficient. The unit block covariance matrix calculator 511*a* of FIG. 6 operates according to Equation (9).

As a result obtained by calculating the unit block covariance matrix, an average value may converge close to an expected value if the number of RSs is sufficient during a time of period for finding $K_j$, and the accuracy decreases if the number of RSs is not sufficient. Accordingly, the covariance matrix calculator 511 needs to calculate the covariance matrix using sufficiently large number of RSs. To this end, the moving average calculator 511b calculates an interference cancellation coefficient by using $K_j$ calculated around a target region to perform a moving average by W as Equation (10) below.

$$\hat{K}_j = \frac{1}{W} \sum_{k=0}^{W-1} K_{j-\lfloor W/2 \rfloor + k} \qquad (10)$$

In Equation (10), an index of $K_{j-\lfloor W/2 \rfloor + k}$ always has a value between 0 and the number $N_{RB}-1$ of unit blocks on a frequency axis. Accordingly, the moving average calculator 511b processes $K_{j-\lfloor W/2 \rfloor + k}$ at both ends of the frequency axis according Equation (11) below.

$$\begin{aligned}&\text{if } j - \lfloor W/2 \rfloor + k < 0 \\ &\quad K_{j-\lfloor W/2 \rfloor + k} = K_{j-\lfloor W/2 \rfloor + k + W} \\ &\text{elseif } j - \lfloor W/2 \rfloor + k > N_{RB} - 1 \mid \\ &\quad K_{j-\lfloor W/2 \rfloor + k} = K_{j-\lfloor W/2 \rfloor + k - W} \\ &\text{endif}\end{aligned} \qquad (11)$$

The covariance matrix calculator 511 may finally calculate a covariance matrix of a j-th area on the frequency axis using Equation (11).

An existing MIMO receiver is designed in consideration of only a white Gaussian noise environment without interference. Accordingly, an existing ML detector searches for a symbol that minimizes $(r-u)^H(r-u)$. The existing ML detector finds a distance between a received signal and an estimated transmit signal to find a symbol having the smallest value. Thus, a bit LLR is calculated using Equation (12) below.

$$\Lambda_{j,k} = \min_{s \in S_{s_{j(b_k=1)}}} [(r - Hs)^H (r - Hs)] - \min_{s \in S_{s_{j(b_k=0)}}} [(r - Hs)^H (r - Hs)] \qquad (12)$$

However, the configuration of the MIMO receiver should be modified in order to consider the interference of Equation (4) above. This is because the ML detector considering the interference of Equation (4) above calculates the bit LLR using the inverse matrix of the covariance matrix K. Furthermore, the MIMO receiver considering the interference of Equation (4) cannot be transformed to a MIMO receiver with simplified complexity because the MIMO receiver uses QR decomposition used in a multi-stream environment.

Accordingly, the example proposes a configuration available for the MIMO receiver 1000 designed in consideration of the interference in addition to the white Gaussian noise environment.

If the covariance matrix K can be decomposed into a product of two square root matrices, the MIMO receiver may calculate a bit LLR as Equation (13) below.

$$\Lambda_{j,k} = \min_{s \in S_{s_{j(b_k=1)}}} [(r' - H's)^H (r' - H's)] - \min_{s \in S_{s_{j(b_k=0)}}} [(r' - H's)^H (r' - H's)] \qquad (13)$$

In Equation (13), r' and H' are expressed as Equations (14) and (15), respectively.

$$r' = K^{-1/2} r \qquad (14)$$

$$H' = K^{-1/2} H \qquad (15)$$

That is, if the received signal r and the channel value H are multiplied by $K^{-1/2}$ and thus converted into r' and H', respectively, the configuration of the existing ML detector designed in consideration of only white noise may be used without modification. The interference cancellation filters 521 and 522 of FIG. 3 are configured to apply Equations (14) and (15) to the received signal r and the channel estimate H, respectively.

The interference cancellation coefficient calculator 510 of FIG. 3 is configured to calculate $\hat{K}_j^{-1/2}$ to be applied to the interference cancellation filters 521 and 522 of FIG. 3. $\hat{K}_j^{-1/2}$ is a result obtained by decomposing the covariance matrix $\hat{K}_j$ calculated for each unit block expressed as Equation (10) above into the two square root matrices.

The square root inverse matrix of $\hat{K}_j$ calculated by the covariance matrix calculator 511 may be found in various methods, as shown in FIG. 4. FIG. 4 (a) shows a configuration for finding the square root inverse matrix at one time according to a predetermined equation, which can be applied to a 2×2 square matrix, FIG. 4 (b) shows a configuration for finding a square root matrix of $\hat{K}_j$ and then an inverse matrix of the square root matrix to calculate $\hat{K}_j^{-1/2}$, and FIG. 4 (c) shows a configuration for finding the inverse matrix and then the square root matrix.

The square root inverse matrix calculator 512 or the square root matrix calculator 513 of FIG. 4 may perform square root matrix calculation in various methods. In particular, when Cholesky decomposition is used, the square root matrix becomes an upper triangular matrix. When the square root matrix is found in a method of finding the upper triangular matrix, calculation complexity may be significantly reduced. $\hat{K}_j^{-1/2}$ calculated by using this method is a coefficient of the interference cancellation filters 521 and 522. The interference cancellation filters 521 and 522 calculate the interference-cancelled received signal r' and the interference-cancelled channel estimate H' by multiplying each of the received signal r and the channel estimate H by $\hat{K}_j^{-1/2}$.

For each unit block, the first interference cancellation filter 521 performs calculation using Equation (16) below, and the second interference cancellation filter 522 performs calculation using Equation (17) below.

$$r' = K_j^{-1/2} r \qquad (16)$$

$$H' = K_j^{-1/2} H \qquad (17)$$

In general, the MIMO receiver 1000 using the interference cancellation filter 520 has more excellent performance than the existing MIMO receiver. However, the MIMO receiver using only the interference cancellation filter 520 may have lower performance with respect to a specific interference signal because of interference signal characteristics and implementation errors caused by a bit resolution which occurs in hardware implementation.

If the performance is degraded, the ML detector 600 should use the received signal r and the channel estimate H and should not apply the interference cancellation. To this end, the MIMO receiver may further include an interference cancellation output controller 540.

Figure 7:
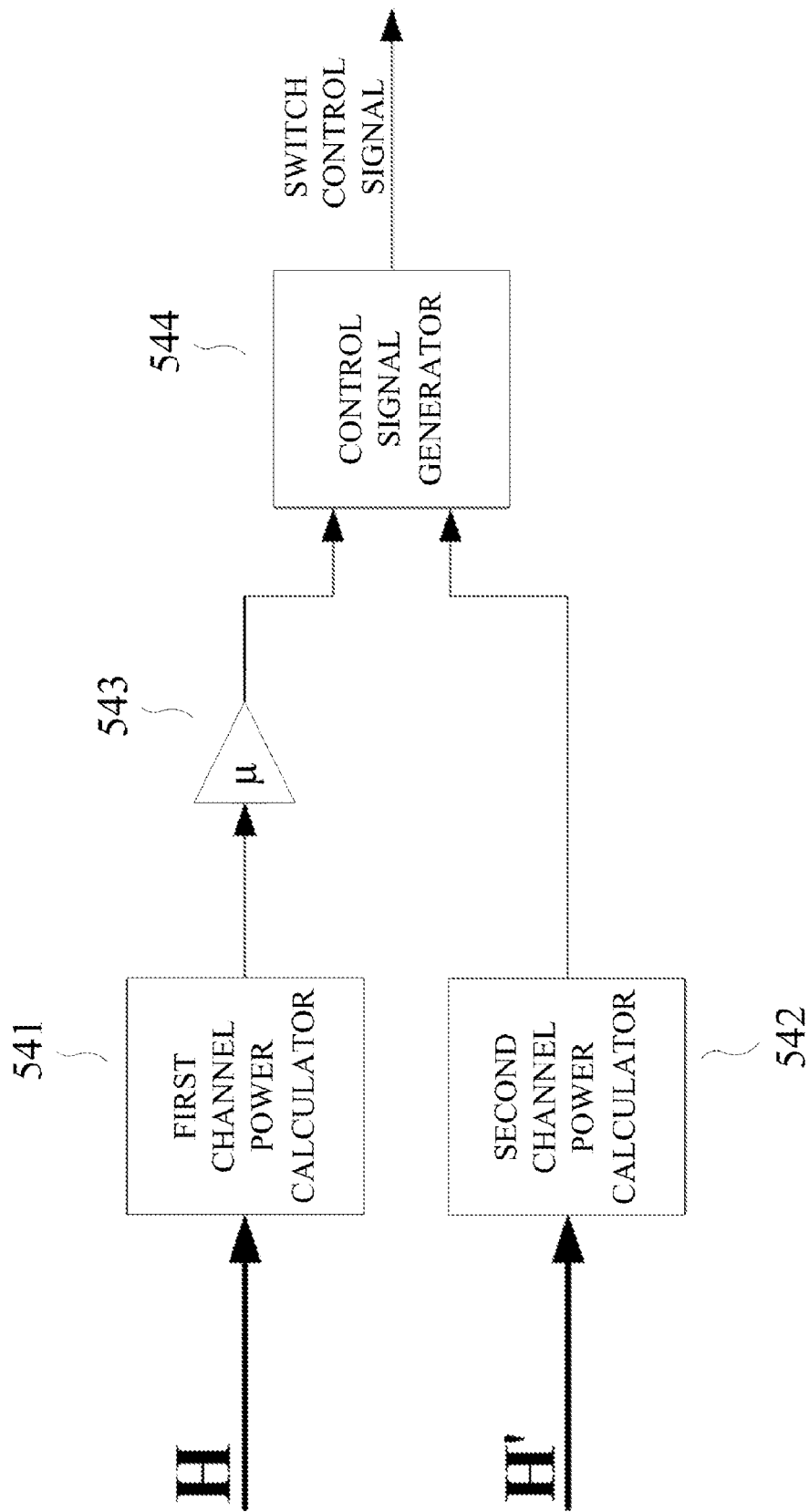
FIG. 7 is an exemplary block diagram showing a configuration of an interference cancellation output controller of FIG. 3.

FIG. 7 is an exemplary block diagram showing a configuration of the interference cancellation output controller of FIG. 3. The interference cancellation output controller 540 includes a first channel power calculator 541 configured to calculate a channel power (first channel power) of a channel estimate H before applying the interference cancellation, a second channel power calculator 542 configured to calculate a channel power (second channel power) of an interference-cancelled channel estimate H' after applying the interference cancellation, and a control signal generator 544 configured to generate a control signal for selecting the interference-cancelled received signal r' and the interference-cancelled channel estimate H' after passing through the interference cancellation filters 521 and 522 when a ratio of the first channel power and the second channel power is greater than a specific threshold value and selecting the received signal r and the channel estimate H before passing through the interference cancellation filters 521 and 522 when the ratio of the first channel power and the second channel power is less than or equal to the specific threshold value. The switch of FIG. 3 operates in response to the control signal generated by the control signal generator 544.

In FIG. 7, a weight adder 543 connected to the first channel power calculator 541 is configured to give a certain weighting factor. The weight adder 543 corresponds to the increment or decrement operator 530 of FIG. 3, which is configured to increase or decrease the channel estimate H.

The interference cancellation output controller 540 measures the channel estimate H before applying the interference cancellation and the channel estimate H' after applying the interference cancellation and generates a control signal according to whether the ratio H'/H exceeds a specific threshold value. The interference cancellation output controller generates a control signal for each sub-carrier.

The measurement of the channel power may be implemented in various methods. The method of generating a control signal may be implemented as an example below.

TABLE 1 if g(H')< μ · g(H)
    SWITCH CONTROL SIGNAL = 0
else
    SWITCH CONTROL SIGNAL = 1
end Here, a function g( ) is a channel power measurement function for measuring a signal quality.

A switch operation for receiving a control signal to select an output includes outputting the received signal r and channel estimate H before applying the interference cancellation according to a switch control signal or outputting the received signal r' and channel estimate H' after applying the interference cancellation.

TABLE 2 if SWITCH CONTROL SIGNAL= 0
    $\hat{r} = \lambda r$
    $\hat{H} = \lambda H$
else
    $\hat{r} = r'$
    $\hat{H} = H'$
end $\hat{r}$ and $\hat{H}$ denote final output values selected by the first switch 551 and the second switch 552, respectively. The switch also operates in units of subcarriers. λ is a coefficient for the increment or decrement operator 530 to increase or decrease the received signal and channel estimate.

Figure 8:
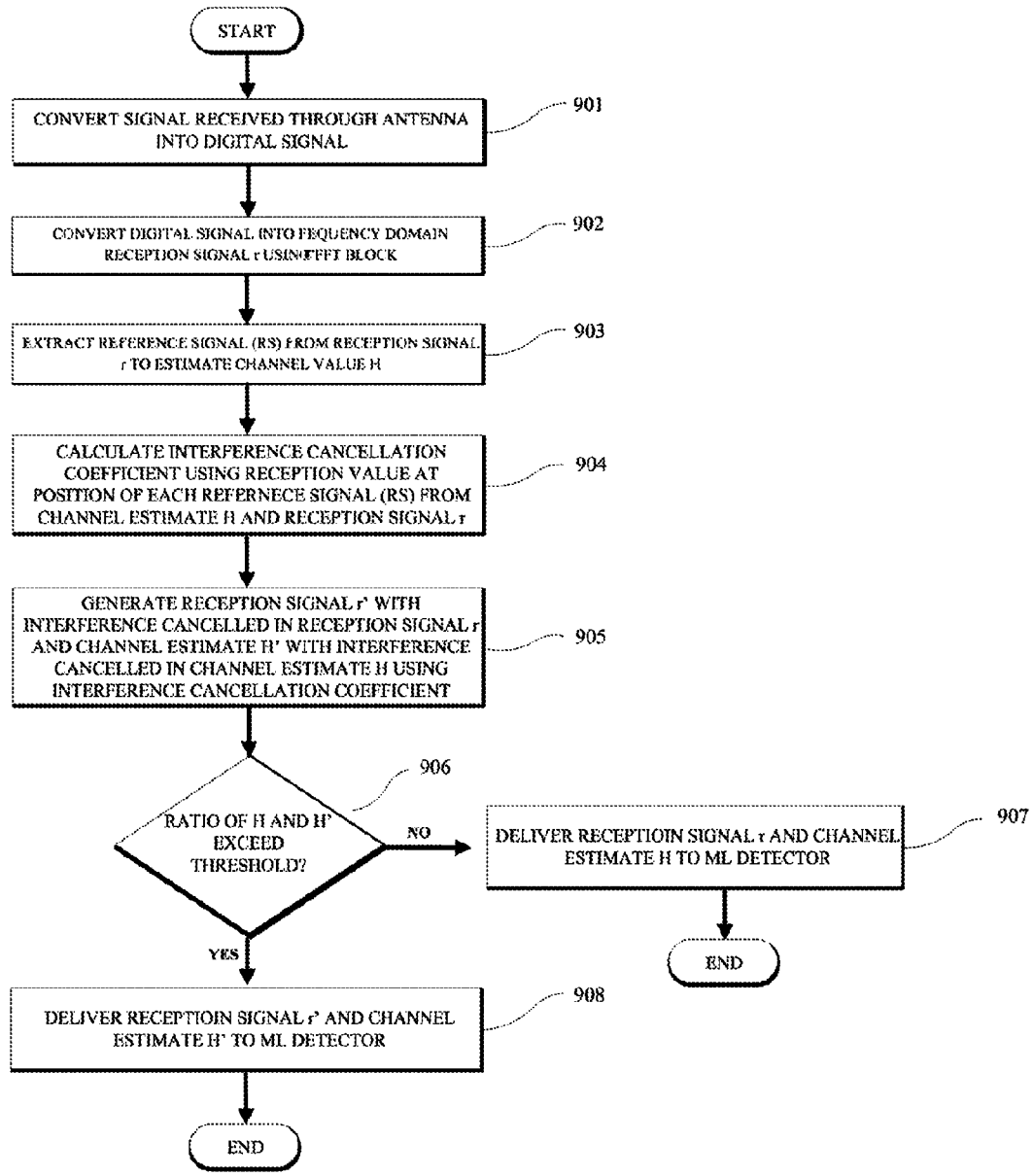
FIG. 8 is an exemplary flowchart of illustrating a method of canceling interference in an MIMO receiver.

FIG. 8 is an exemplary flowchart illustrating a method of canceling interference in the MIMO receiver 1000.

A method of canceling interference in the MIMO receiver 1000 includes converting a signal received from an antenna into a digital signal (901), converting the digital signal into a frequency domain received signal r using an FFT block (902), extracting a reference signal (RS) from the received signal r to estimate a channel value H (903), calculating an interference cancellation coefficient using a received value at a position of each reference signal (RS) from the channel estimate H and the received signal r (904), and generating the interference-cancelled received signal r' and the interference-cancelled channel estimate H', using the interference cancellation coefficient (905).

The process of calculating an interference cancellation coefficient (904) includes calculating a covariance matrix using the received signal r and the channel estimate H, a square root inverse matrix of the covariance matrix, and then the interference cancellation coefficient. The calculating process 904 may be performed in various methods as shown in FIG. 4.

The calculating process 904 includes calculating the covariance matrix for each unit block and performing a moving average on the covariance matrix for each unit block.

The process of generating the interference-cancelled received signal r' and the interference-cancelled channel estimate H' 905 includes canceling the interference by multiplying the received signal r and the channel estimate H by the interference cancellation coefficient $\hat{K}_j^{-1/2}$, respectively.

The method of canceling the interference in the MIMO receiver further includes determining whether a ratio of H and H' exceeds a threshold value (906) after the generating of the interference-cancelled received signal r' and the interference-cancelled channel estimate H' using the interference cancellation coefficient (905).

The method includes delivering the received signal r' and channel estimate H' after applying the interference cancellation to an ML detector when the ratio exceeds the threshold value (908) and delivering the received signal r and channel estimate H before applying the interference cancellation to the ML detector when the ratio does not exceed the threshold value (907).

According to the example, it is possible to minimize inter-cell interference by simply adding an interference canceller to an existing receiver in a multi-cell environment. Furthermore, it is also possible to implement a receiver at a low cost by simply adding an interference canceller without changing a configuration of the existing receiver.

Technical effects described below are not limited to the aforesaid, but other effects not described herein will be clearly understood by those skilled in the art from descriptions below.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interference canceller used in a MIMO receiver, the interference canceller comprising:

an interference cancellation coefficient calculator configured to calculate an interference cancellation coefficient using a received value at a subcarrier frequency location of each reference signal (RS) from a channel estimate H calculated by a channel estimator of the MIMO receiver and a received signal r delivered from an FFT block of the MIMO receiver; and an interference cancellation filter configured to generate an interference-cancelled received signal r' and a channel estimate H', using the interference cancellation coefficient, wherein the reference signal (RS) is a known symbol located in a specific subcarrier frequency in a frequency domain, and further comprising a switch configured to deliver the received signal r and the channel estimate H to an ML detector of the MIMO receiver when a ratio of the channel estimate H and the interference-cancelled channel estimate H' does not exceed a threshold value, and to deliver the interference-cancelled received signal r' and the channel estimate H' to the ML detector of the MIMO receiver when the ratio exceeds the threshold value.

2. The interference canceller of claim 1, further comprising:

an increment or decrement operator configured to increase or decrease the received signal r and the channel estimate H by $\lambda$ times;

a switch configured to deliver the received signal r and the channel estimate H to the ML detector or deliver the interference-cancelled received signal r' and the interference-cancelled channel estimate H' the ML detector; and an interference cancellation output controller configured to deliver a control signal for selecting the increased or decreased received signal r and channel estimate to the switch when the ratio of the channel estimate H and the interference-cancelled channel estimate H' does not exceed a threshold value, and deliver a control signal for selecting the interference-cancelled received signal r' and the interference-cancelled channel estimate H' to the switch when the ratio exceeds the threshold value.

3. The interference canceller of claim 1, wherein the interference cancellation coefficient calculator comprises:

a covariance matrix calculator configured to receive the received signal r and the channel estimate H to calculate a covariance matrix; and a square root inverse matrix calculator configured to calculate a square root inverse matrix of the covariance matrix.

4. The interference canceller of claim 3, wherein the covariance matrix calculator comprises:

a unit block covariance matrix calculator configured to calculate a unit block covariance matrix; and a moving average calculator configured to perform a moving average on the unit block covariance matrix to calculate an interference cancellation coefficient.

5. The interference canceller of claim 4, wherein the unit block covariance matrix calculator calculates the unit block covariance matrix $K_j$ using a following equation:

$$K_j = \frac{1}{M_i} \sum_{k \in P_j} [(r_k - H_k p_k)(r_k - H_k p_k)^H],$$

wherein $P_j$ is a set of indices of subcarriers on which RSs are transmitted at an area of a j-th unit block on a frequency axis, $M_i$ is a total number of subcarriers on which RSs are transmitted at an area of a j-th unit block, and $P^k$ is an RS symbol vector that is transmitted on a k-th subcarrier.

6. The interference canceller of claim 4, wherein the moving average calculator performs a moving average on the unit block covariance matrix $K_j$ by W, using a following equation:

$$\hat{K}_j = \frac{1}{W} \sum_{k=0}^{W-1} K_{j-\lfloor W/2 \rfloor + k}.$$

7. The interference canceller of claim 6, wherein the moving average calculator adjusts an index such that $K_{j-\lfloor W/2 \rfloor + k}$ has a value between 0 and the number of unit blocks.

8. The interference canceller of claim 3, wherein the square root inverse matrix calculator calculates a square root matrix using Cholesky decomposition.

9. The interference canceller of claim 1, wherein the interference cancellation coefficient calculator receives the received signal r and the channel estimate H and decomposes a covariance matrix into a product of two square root matrices to calculate the interference cancellation coefficient.

10. The interference canceller of claim 9, wherein the interference cancellation filter cancels interference by multiplying each of the received signal r and the channel estimate H by the interference cancellation coefficient $\hat{K}_j^{-1/2}$, and $\hat{K}_j$ a covariance matrix calculated for each unit block.

11. A method of canceling interference in a MIMO receiver, the method comprising:

converting a signal received from an antenna into a digital signal;

converting the digital signal into a frequency domain received signal r using an FFT block;

extracting a reference signal (RS) from the received signal r to estimate a channel value H;

calculating an interference cancellation coefficient using a received value at a subcarrier frequency location of each reference signal (RS) from the channel estimate H and received signal r; and generating an interference-cancelled received signal r' and an interference-cancelled channel estimate H' with interference cancelled therein, using the interference cancellation coefficient, wherein the reference signal (RS) is a known symbol located in a specific subcarrier frequency in a frequency domain, and wherein the calculating comprises:

receiving the received signal r and the channel estimate H and calculating a covariance matrix, and calculating a square root inverse matrix of the covariance matrix.

12. The method of claim 11, wherein the calculating of a covariance matrix comprises: calculating a unit block covariance matrix; and performs a moving average on the unit block covariance matrix.

13. The method of claim 12, wherein the moving average is performed on the unit block covariance matrix $K_j$ by W, using a following equation:

$$\hat{K}_j = \frac{1}{W} \sum_{k=0}^{W-1} K_{j-\lfloor W/2 \rfloor + k},$$

wherein $$K_j = \frac{1}{M_i} \sum_{k \in P_j} [(r_k - H_k p_k)(r_k - H_k p_k)^H],$$

$P_j$ is a set of indices of subcarriers on which RSs are transmitted at an area of a j-th unit block on a frequency axis, $M_i$ is a total number of subcarriers on which RSs are transmitted at an area of a j-th unit block, and $P^K$ is an RS symbol vector that is transmitted on a k-th subcarrier.

14. The method of claim 11, wherein the generating comprises canceling the interference by multiplying each of the received signal r and the channel estimate H by the interference cancellation coefficient $\hat{K}_j^{-1/2}$, and, $\hat{K}_j$ is a covariance matrix calculated for each unit block.

15. The method of claim 11, further comprising:
delivering the received signal r and the channel estimate H to an ML detector when a ratio of the channel estimate H and the interference-cancelled channel estimate H' does not exceed a threshold value; and
delivering the interference-cancelled received signal r' and the interference-cancelled channel estimate H' to the ML detector when the ratio exceeds the threshold value.

16. A MIMO receiver comprising:
a signal processor configured to convert a signal received from an antenna into a digital signal;
an FFT block configured to convert the digital signal into a frequency domain received signal r;
a channel estimator configured to extract a reference signal (RS) from the received signal r to estimate a channel value H;
an interference canceller configured to calculate an interference cancellation coefficient using a received value at a subcarrier frequency location of each reference signal (RS) from the received signal r and the channel estimate H, and to cancel interference from the received signal r and the channel estimate H using the interference cancellation coefficient;
an ML detector configured to receive an interference-cancelled received signal r' and an interference-cancelled channel estimate H' from the interference canceller; and
a switch configured to deliver the received signal r and the channel estimate H to the ML detector when a ratio of the channel estimate H and the interference-cancelled channel estimate H' does not exceed a threshold value, and to deliver the interference-cancelled received signal and the interference cancelled channel estimate H to the ML detector when the ratio exceeds the threshold value,
wherein the reference signal (RS) is a known symbol located in a specific subcarrier frequency in a frequency domain.

17. The MIMO receiver of claim 16, wherein the interference canceller comprises:
an interference cancellation coefficient calculator configured to receive the received signal r and the channel estimate H to calculate a unit block covariance matrix $\hat{K}_j$ and perform a moving average on the unit block covariance matrix $\hat{K}_j$ to calculate an interference cancellation coefficient $\hat{K}_j^{-1/2}$; and
an interference cancellation filter configured to multiply each of the received signal r and the channel estimate H by the interference cancellation coefficient $\hat{K}_j^{-1/2}$ to cancel the interference.

* * * * *